US012693445B2

(12) United States Patent
Laake

(10) Patent No.: US 12,693,445 B2
(45) Date of Patent: Jul. 28, 2026

(54) DE-RISKING SUBSURFACE FLUID PROSPECTS

(71) Applicant: Schlumberger Technology Corporation, Sugar Land, TX (US)

(72) Inventor: Andreas W. Laake, Hannover (DE)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/016,717

(22) Filed: Jan. 10, 2025

(65) Prior Publication Data

US 2025/0231308 A1 Jul. 17, 2025

Related U.S. Application Data

(60) Provisional application No. 63/620,427, filed on Jan. 12, 2024.

(51) Int. Cl.
*G01V 1/30* (2006.01)
*E21B 21/08* (2006.01)
*E21B 44/00* (2006.01)

(52) U.S. Cl.
CPC .............. *G01V 1/301* (2013.01); *E21B 21/08* (2013.01); *E21B 44/00* (2013.01)

(58) Field of Classification Search
CPC ..... G01V 1/301; E21B 49/00; E21B 2200/20; E21B 43/26; E21B 7/04; E21B 44/00; E21B 49/008; E21B 41/00; E21B 43/00; E21B 47/0025; E21B 49/087; E21B 47/12;

(Continued)

(56) References Cited

U.S. PATENT DOCUMENTS

| | | | | | |
|---|---|---|---|---|---|
| 5,444,619 | A | * | 8/1995 | Hoskins | ................. G01V 1/306 |
| | | | | | 702/14 |
| 5,995,448 | A | * | 11/1999 | Krehbiel | .................. G01V 1/28 |
| | | | | | 367/68 |
| 9,964,654 | B2 | * | 5/2018 | Laake | .................... G01V 1/345 |

OTHER PUBLICATIONS

Chaves et al., Visualization of Geological Features Using Seismic Volume Rendering, RGB Blending and Geobody Extraction (Year: 2011).*

(Continued)

*Primary Examiner* — Rehana Perveen
*Assistant Examiner* — John David Hagler
(74) *Attorney, Agent, or Firm* — Kyle R. Miiller

(57) ABSTRACT

A method includes receiving seismic data of a subsurface. The method also includes color processing the seismic data to produce color-processed seismic data. The method also includes performing a seismic interpretation on the color-processed seismic data to identify regional geologic features. The method also includes performing first mapping along the regional geologic features to identify local geologic features. The method also includes extracting reservoir bodies from the local geologic features based upon the first mapping. The method also includes performing second mapping along the local geologic features to embed the local geological features into the regional geologic features. The method also includes delineating boundaries of reservoirs or seals in the subsurface based upon the local geologic features that are embedded into the regional geologic features. The method also includes de-risking a fluid prospect in a fluid reservoir based upon the boundaries of the reservoirs or the seals.

16 Claims, 12 Drawing Sheets

(58) Field of Classification Search
CPC .. E21B 21/01; E21B 2200/22; E21B 43/2607;
E21B 47/022; E21B 47/107; E21B
49/005
See application file for complete search history.

(56) References Cited

OTHER PUBLICATIONS

Alcalde, J. et al., "A criteria-driven approach to the CO2 storage site selection of East Mey for the acorn project in the North Sea", Marine and Petroleum Geology, Jul. 15, 2021, pp. 1-14, vol. 133.
Barlass, D. et al., "Improving Carbon Storage Play Assessment through Seismic Interpretation", First Break, Jul. 1, 2023, pp. 81-88, vol. 41, Issue 7.
Barlass, D. et al., "Dedicated carbon storage seismic reprocessing for the Central North Sea CCS site selection", 84th EAGE Annual Conference Exhibition, Jun. 2023, pp. 1-5, vol. 2023.
Branston, M. et al., "What is the Right Level of Acquisition Effort to Enable Successful, Cost-Effective Exploration", 83rd EAGE Annual Conference Exhibition, Jun. 2022, pp. 1-5, vol. 2022.

Chopra, S. et al., "Seismic attributes—A historical perspective", Geophysics, Sep. 14, 2005, pp. 3-28, vol. 70, Issue 5.
Hamilton, R. et al., "Regional Screening for Carbon Storage Opportunities in the UK Southern North Sea", European Association of Geoscientists Engineers, Nov. 2022, pp. 1-5, vol. 2022.
Laake, A., "Structural interpretation in color—A new RGB processing application for seismic data", Interpretation, Feb. 2015, pp. SC1-SC8, vol. 3.
Madsen, A.O. et al., "Color Rendering of Seismic Data—A UK North Sea Case Study Review", 80th EAGE Conference Exhibition, Jun. 11, 2018, 5 Pages.
Matta, M. et al., "Seismic Data Reimaging for Hydrocarbon Prospectivity Evaluation and Determination of Carbon Storage Potential", 83rd EAGE Annual Conference Exhibition, Jun. 6, 2022, pp. 1-5, vol. 2022.
Thomas, R. et al., "Seismic geomorphology and sequence stratigraphy as tools for the prediction of reservoir facies distribution: an example from the Paleocene and earliest Eocene of the South Buchan Graben, Outer Moray Firth Basin, UKCS", Geological Society Special Publications, Jan. 1, 2015, pp. 99-132, vol. 403.

* cited by examiner

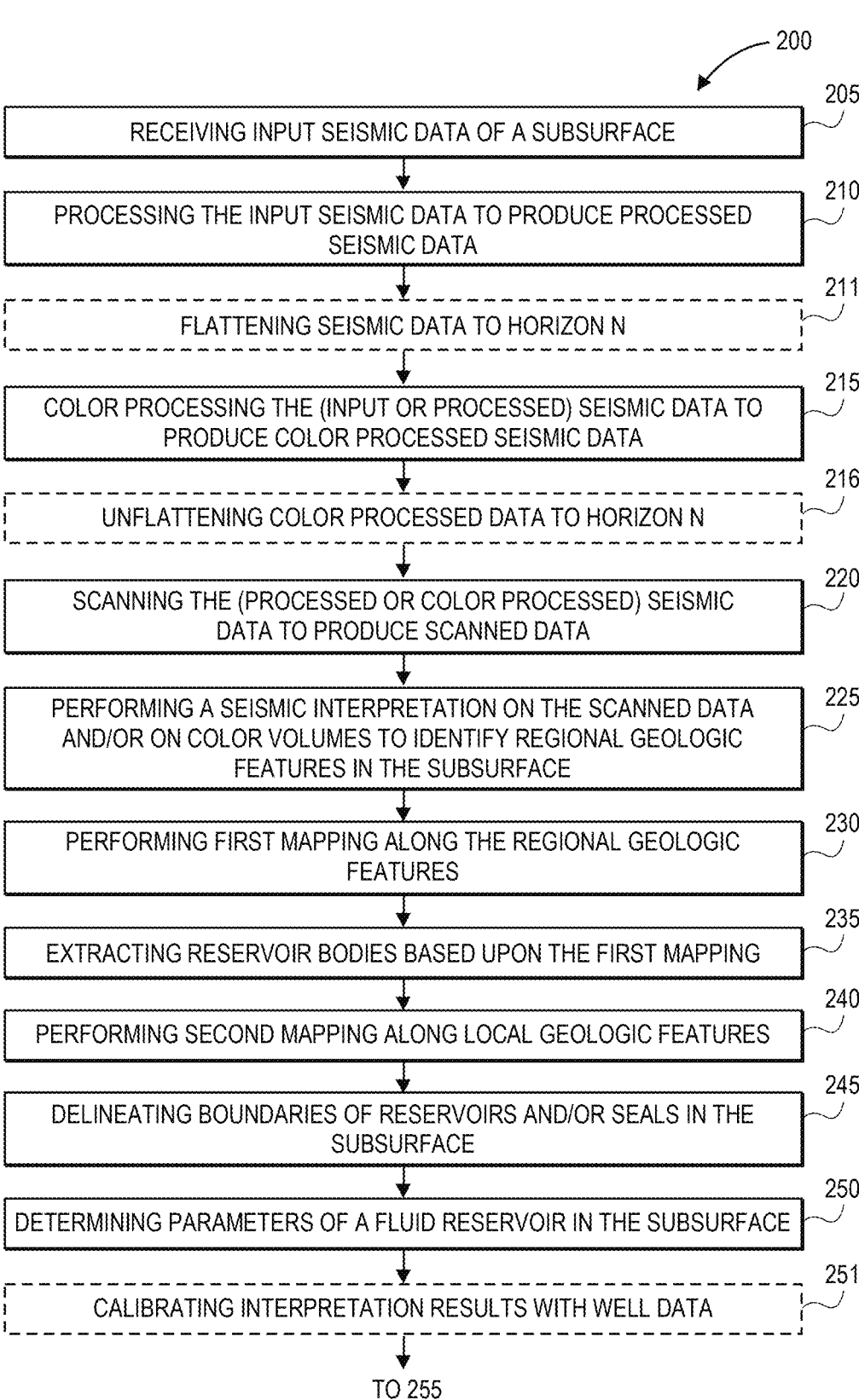

200

205
RECEIVING INPUT SEISMIC DATA OF A SUBSURFACE

210
PROCESSING THE INPUT SEISMIC DATA TO PRODUCE PROCESSED SEISMIC DATA

211
FLATTENING SEISMIC DATA TO HORIZON N

215
COLOR PROCESSING THE (INPUT OR PROCESSED) SEISMIC DATA TO PRODUCE COLOR PROCESSED SEISMIC DATA

216
UNFLATTENING COLOR PROCESSED DATA TO HORIZON N

220
SCANNING THE (PROCESSED OR COLOR PROCESSED) SEISMIC DATA TO PRODUCE SCANNED DATA

225
PERFORMING A SEISMIC INTERPRETATION ON THE SCANNED DATA AND/OR ON COLOR VOLUMES TO IDENTIFY REGIONAL GEOLOGIC FEATURES IN THE SUBSURFACE

230
PERFORMING FIRST MAPPING ALONG THE REGIONAL GEOLOGIC FEATURES

235
EXTRACTING RESERVOIR BODIES BASED UPON THE FIRST MAPPING

240
PERFORMING SECOND MAPPING ALONG LOCAL GEOLOGIC FEATURES

245
DELINEATING BOUNDARIES OF RESERVOIRS AND/OR SEALS IN THE SUBSURFACE

250
DETERMINING PARAMETERS OF A FLUID RESERVOIR IN THE SUBSURFACE

251
CALIBRATING INTERPRETATION RESULTS WITH WELL DATA

DE-RISKING SUBSURFACE FLUID PROSPECTS

CROSS-REFERENCE TO RELATED APPLICATIONS

This patent application claims priority to U.S. Provisional Patent Application No. 63/620,427, filed on Jan. 12, 2024, which is incorporated by reference herein in its entirety.

BACKGROUND

High-resolution, low-noise 3D seismic data may be used as an input for depositional environment mapping to assist de-risking of fluid prospects for extraction of hydrocarbons as well as the storage of carbon dioxide or hydrogen and related drilling. The high-resolution, low-noise 3D seismic data is available as a result of seismic data processing workflows that compensate for strong local velocity anomalies in the overburden and maintain the frequency bandwidth throughout. The interpretation, too, has to retain high vertical resolution to enable high-accuracy mapping of horizons and hence depositional environments.

The geologic storage of carbon dioxide or hydrogen has become a component for reducing greenhouse gas emissions. One element to understand and mitigate the risk associated with the selection of carbon storage sites is the appropriate assessment of reservoirs and seals. In the North Sea, two avenues are followed for the selection process: (1) repurposing of depleted hydrocarbon reservoirs, where the geology of reservoir and seal are well understood and (2) exploration for new sites where saline aquifers in porous formations are sealed often by shale rocks. To ensure the long-term stability of the seal, a minimum depth of about 1000 m overburden is recommended.

For the assessment of the suitability of a site for geological carbon dioxide storage, two data sources may be employed: (1) 3D seismic data to provide full 3D structural information about the subsurface and/or (2) well data (e.g., well logs, drilling logs, and/or cores) to calibrate the seismic data. The combination of both data types provides the information used to compute rock and fluid physics parameters. One challenge with conventional approaches is the vertical resolution of the seismic data and the attributes derived from them. For example, seismic data may be sampled at 4 ms, which converts to no less than 20 m vertical resolution at the output from the seismic attributes. At this resolution, channelized reservoir bodies that would be suitable for carbon dioxide storage are easily overlooked, and the integrity of the seal may not be sufficiently revealed and, hence, the uncertainty of the CO2 storage volume as well as the sealing capacity of the seal may be higher than a predetermined threshold. Furthermore, shallow drilling hazards impacting the drilling of the injection wells may suffer from undetected overburden hazards such as shallow gas possibly resulting in explosions, steep faults, and depositional boundaries which may deviate the wellbore and overpressure resulting in kicks. Therefore, a solution is needed to address one or more of the problems identified above.

SUMMARY

A method for de-risking fluid prospects in a subsurface is disclosed. The method includes receiving seismic data of the subsurface. The method also includes color processing the seismic data to produce color-processed seismic data. The method also includes performing a seismic interpretation on the color-processed seismic data to identify regional geologic features. The method also includes performing first mapping along the regional geologic features to identify local geologic features. The method also includes extracting reservoir bodies from the local geologic features based upon the first mapping. The method also includes the correlation with well data such as well logs, drilling logs, and/or core data, which may be used to calibrate the geologic features interpreted from seismic data to rock and fluid properties. The method also includes performing second mapping along the local geologic features to embed the local geological features into the regional geologic features. The method also includes delineating boundaries of reservoirs or seals in the subsurface based upon the local geologic features that are embedded into the regional geologic features. The method also includes de-risking a fluid prospect in a fluid reservoir based upon the boundaries of the reservoirs or the seals.

A computing system is also disclosed. The computing system includes one or more processors and a memory system. The memory system includes one or more non-transitory computer-readable media storing instructions that, when executed by at least one of the one or more processors, cause the computing system to perform operations. The operations include receiving seismic data of a subsurface. The seismic data includes 3D seismic data. The operations also include color processing the seismic data to produce color-processed seismic data. Color processing the seismic data comprises red-green-blue (RGB) color processing, which creates color volumes for geologic interpretation of the subsurface. The color volumes have a higher resolution than the seismic data. The operations also include performing a seismic interpretation on the color volumes to identify regional geologic features in the subsurface. The regional geologic features include channels, slope features, horizons, or faults. The operations also include performing first mapping along the regional geologic features. Performing the first mapping includes performing depositional environment and structural mapping along the horizons using the color volumes to identify local geologic features within the regional geologic features. The operations also include extracting reservoir bodies based upon the first mapping. The reservoir bodies are extracted from the local geologic features. The reservoir bodies include sand bodies having a higher porosity than shale bodies. The operations also include performing second mapping along the local geologic features to embed the reservoir bodies into the regional geologic features. The operations may also include correlating the local geologic features and/or the regional geologic features with well data captured in a well for calibration of the seismic interpretation with rock and fluid properties. The well data includes well logs, drilling logs, and/or core data. The operations also include delineating boundaries of reservoirs and seals in the subsurface based upon the reservoir bodies that are embedded into the regional geologic features. The operations also include de-risking a fluid prospect in a fluid reservoir based upon the boundaries of the reservoirs and the seals. The fluid prospect includes a carbon capture and storage (CCS) prospect, a hydrogen storage prospect, or a lithium brine extraction prospect. The operations also include displaying the regional geologic features, the local geologic features, the reservoir bodies, the boundaries and seals, or the fluid prospect.

A non-transitory computer-readable medium is also disclosed. The medium stores instructions that, when executed by one or more processors of a computing system, cause the computing system to perform operations. The operations include receiving input seismic data of a subsurface. The input seismic data may be or include 3D seismic data. The operations may also include processing the input seismic data to produce processed seismic data. Processing the input seismic data includes modifying the input seismic data to correct for seismic near-surface velocity fluctuations in the input seismic data. Processing the input seismic data retains the frequency bandwidth of the input seismic data. The processed seismic data has a cleaner and more balanced seismic amplitude response in a lateral direction than the input seismic data. The operations may also include flattening the processed seismic data to produce flattened seismic data. The processed seismic data is flattened in response to the processed seismic data including a steeply dipping horizon. The operations may also include color processing the flattened seismic data to produce color-processed seismic data. Color processing the processed seismic data includes red-green-blue (RGB) color processing, which creates color volumes for geologic interpretation of the subsurface. The color volumes have a higher resolution than the input seismic data and the processed seismic data. Flattening the processed seismic data avoids interference of the steeply dipping horizons with the color processing. The operations may also include unflattening the color-processed seismic data to produce unflattened color-processed seismic data. The operations may also include scanning the unflattened color-processed seismic data to produce scanned data. Scanning the unflattened color-processed seismic data includes performing a geologic inventory scan that uses a flat time horizon or a flat depth horizon to extract color values from the color volumes. Scanning the unflattened color-processed seismic data identifies classes of geologic features. The operations may also include performing a seismic interpretation on the scanned data or on the color values to identify regional geologic features in the subsurface. The regional geologic features include channels, slope features, horizons, or faults. The operations may also include performing first mapping along the regional geologic features. Performing the first mapping includes performing depositional environment and structural mapping along the horizons using the color values to identify local geologic features within the regional geologic features. The operations may also include extracting reservoir bodies based upon the first mapping. The reservoir bodies are extracted from the local geologic features. The reservoir bodies include sand bodies having a higher porosity than shale bodies. The operations may also include performing second mapping along the local geologic features to embed the local geological features into the regional geologic features. Performing the second mapping includes embedding the reservoir bodies into the regional geologic features. The operations may also include correlating the local geologic features and/or the regional geologic features with well data captured in a well for calibration of the seismic interpretation with rock and fluid properties. The well data may include well logs, drilling logs, and/or core data. The operations may also include extrapolating the rock and fluid properties based upon the well data away from the well into a seismic data volume using seismic horizons and starting at an intersection of the seismic horizons with the well. The operations may also include delineating boundaries of reservoirs and seals in the subsurface based upon the local geologic features that are embedded into the regional geologic features. The operations may also include determining a volume and a porosity of a fluid reservoir in the subsurface based upon the boundaries of reservoirs and seals. The operations may also include de-risking a fluid prospect in the fluid reservoir based upon the volume and the porosity. The fluid prospect includes a carbon capture and storage (CCS) prospect, a hydrogen storage prospect, or a lithium brine extraction prospect. The fluid prospect is de-risked by assessing the rock and fluid properties of the reservoir bodies to determine whether channels or cavities are present therein, assessing the seals for potential breaches by the faults or fractures, and assessing an overburden for sufficient thickness to support the seals. The operations may also include displaying the regional geologic features, the local geologic features, the reservoir bodies, the boundaries and seals, the volume and porosity, and the fluid prospect.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 2A and 2B illustrate a flowchart of a method for de-risking fluid prospects in a subsurface, according to an embodiment.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

System Overview

Figure 1:
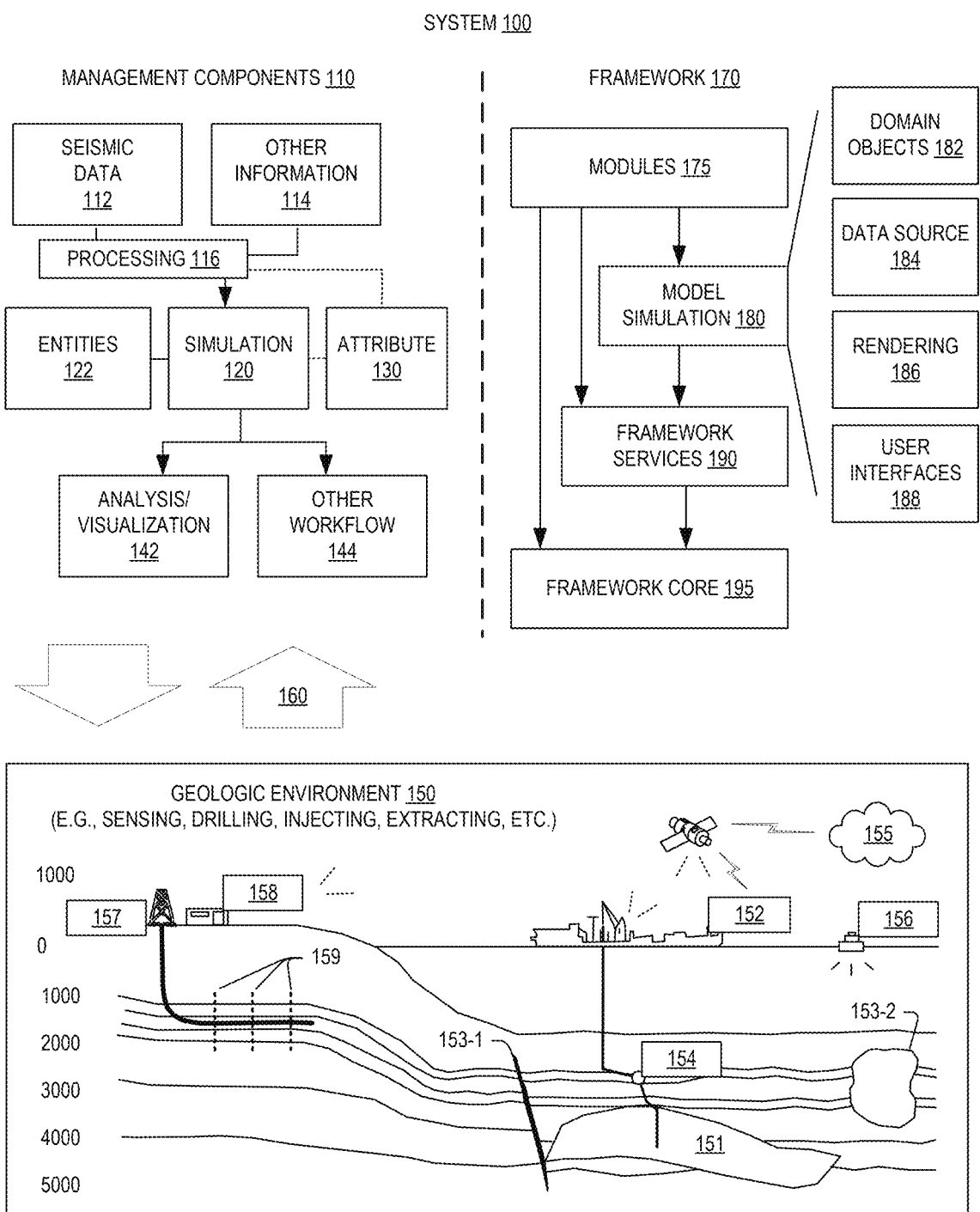
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116 (e.g., including calibration of the processing results with well data), a simulation component 120, an attribute component 130, an analysis/visualization component 142 and a workflow component 144. In operation, seismic data and other information provided per the components 112 and 114 may be input to the simulation component 120. The other information may be or include well data. The components, 112, 114 may be or include well data such as well logs, drilling logs, and/or cores, which may be used to calibrate the seismic data to rock and fluid properties.

In an example embodiment, the simulation component 120 may rely on entities 122. Entities 122 may include earth entities or geological objects such as wells, well data (e.g., used for calibration of rock and fluid properties), surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT®.NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (SLB, Houston Texas), the INTERSECT™ reservoir simulator (SLB, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (SLB, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (SLB, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Exemplary Method

Figure 2B:
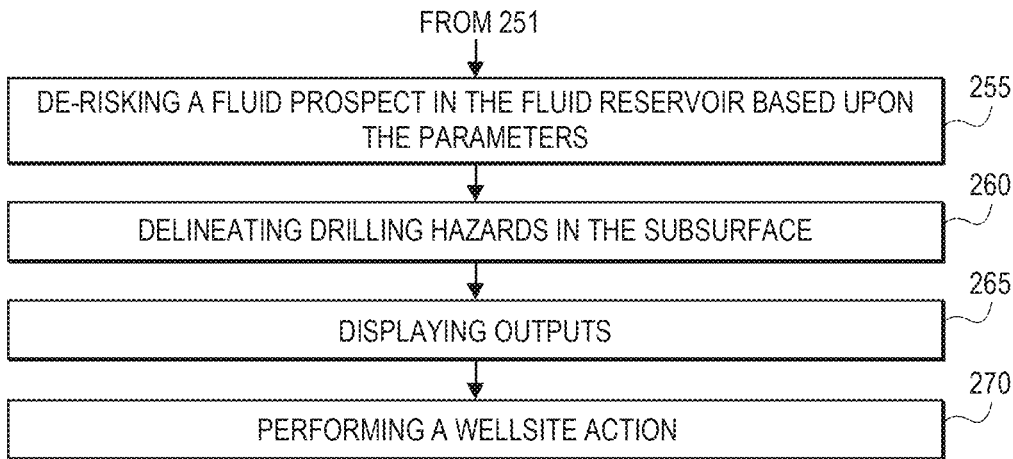
Figure 3:
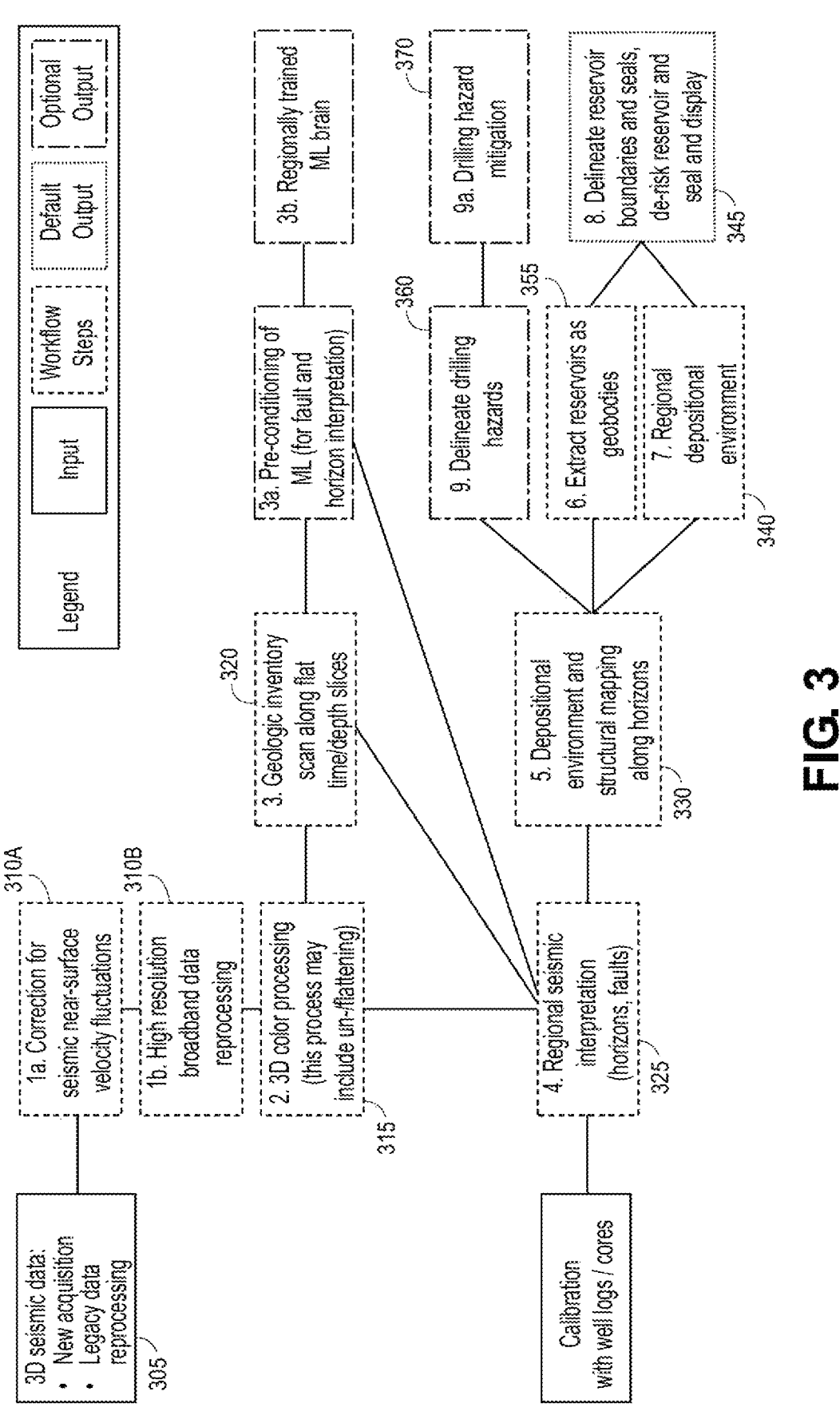
FIG. 3 illustrates a schematic view of the flowchart shown in FIGS. 2A and 2B, according to an embodiment.

FIGS. 2A and 2B illustrate a flowchart of a method 200 for de-risking fluid prospects in a subsurface, according to an embodiment. More particularly, the method 200 may be used for de-risking CCS prospects and/or drilling supported by depositional environments. An illustrative order of the method 200 is provided below; however, one or more portions of the method 200 may be performed in a different order, simultaneously, repeated, or omitted. At least a portion of the method 200 may be performed using a computing system (described below). FIG. 3 illustrates a schematic view of the flowchart shown in FIGS. 2A and 2B, according to an embodiment.

The method 200 may include receiving input seismic data of a subsurface, as at 205. This is also shown at 305 in FIG. 3. The input seismic data may be or include 3D seismic data. The input seismic data may be or include new acquisition data and/or legacy data reprocessing. For the legacy data, a seamless match and merge may be performed.

The method 200 may also include processing the input seismic data to produce processed seismic data, as at 210. This is also shown at 310A and 310B in FIG. 3. The processing may modify the input seismic data to correct for seismic near-surface velocity fluctuations in the input seismic data. The processed seismic data may have a cleaner and/or more balanced seismic amplitude response in the lateral direction. This may be referred to as high-resolution seismic data (re-)processing. As used herein, a clean seismic amplitude response refers to seismic data that can be distinguished from noise. As used herein, a balanced seismic amplitude response refers to an amplitude spectrum in which the spectral amplitude of the signal is higher than the spectral amplitude of the noise throughout the entire spectral bandwidth used in the process. The processing may retain the frequency bandwidth of the input seismic data. If a shallow velocity model already exists, then processing the input seismic data may be the start of the method 200. If no shallow velocity model exists, then the input seismic data may be processed, and the color processing (described below) may be performed to map shallow geologic features and to use the information for velocity estimation for a near-surface velocity model for use in the processing of the input seismic data.

The method 200 may also optionally (as indicated by the dashed lines) include flattening the input seismic data, as at 211. The input seismic data may be flattened using an interpreted horizon from steps 225 and/or 240 prior to executing the color processing in step 215. This may be beneficial for steeply dipping horizons where the horizon dip would interfere with the color processing if the dip is not corrected prior to executing step 215.

The method 200 may also include color processing the (e.g., input or processed) seismic data to produce color-processed seismic data, as at 215. This is also shown at 315 in FIG. 3. The color processing may be or include RGB color processing, which creates high-resolution color volumes (e.g., RGB data cubes) for geologic interpretation of the subsurface. The color volumes may have a higher resolution than the input seismic data and/or the processed seismic data.

Creation of RGB Slices

Figure 4:
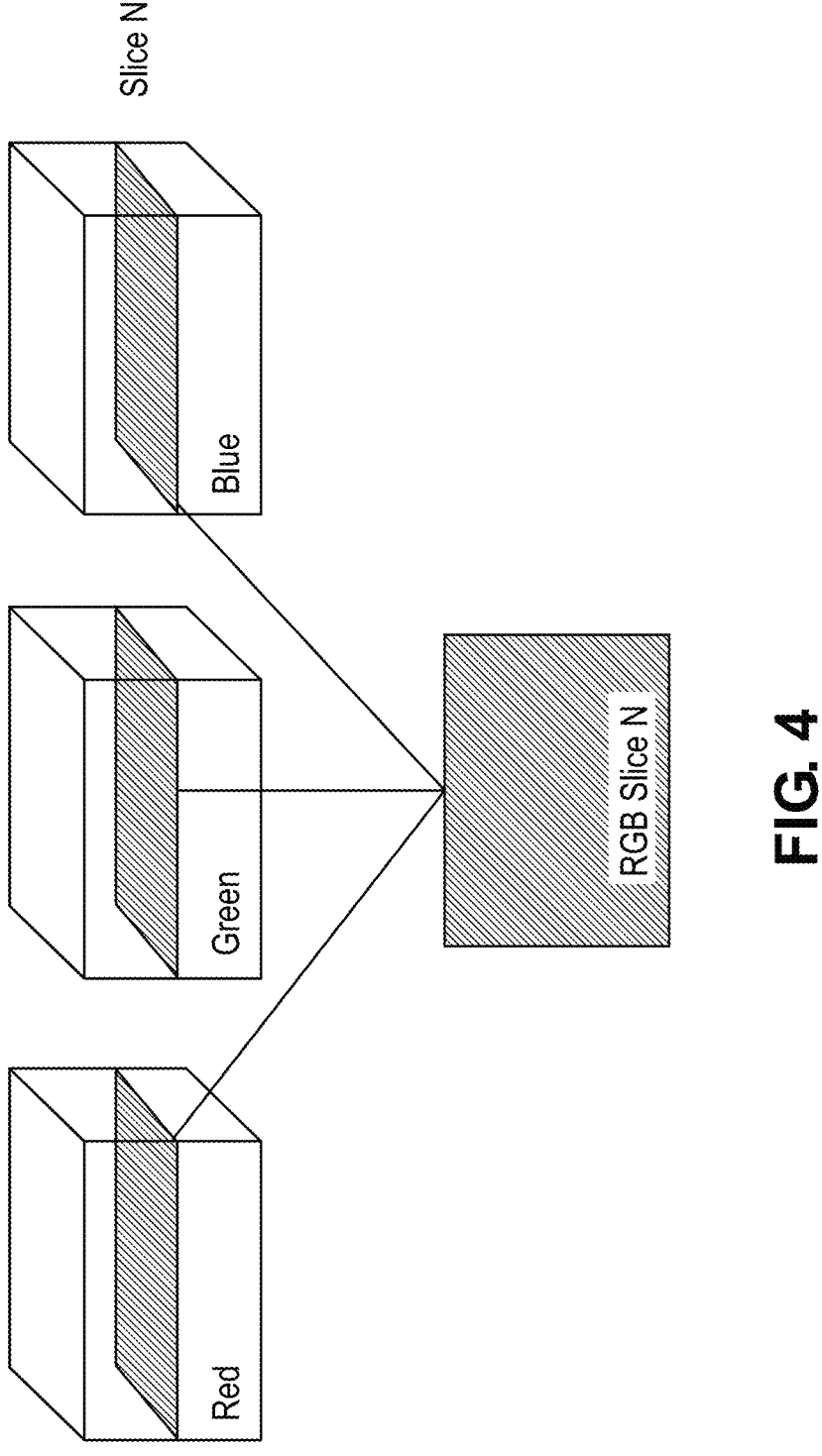
FIG. 4 illustrates RGB slices created from RGB cubes that result from color processing, according to an embodiment.

FIG. 4 illustrates a creation of RGB slices from RGB cubes that result from color processing (e.g., 215 in FIGS. 2A and 2B), according to an embodiment. The interpretation starts with a geologic inventory scan that aims at detecting a multiplicity of geologic features contained in the 3D seismic data volume under investigation. To enable this scan, the RGB color values resulting from the color processing of the seismic data are extracted along a flat surface, which is either a constant time surface for two-way travel time (TWT) data or a flat depth surface for data in the depth domain, as shown in FIG. 4.

The method 200 may also optionally (as indicated by the dashed lines) include unflattening the color processed data, as at 216. The color processed data may be unflattened to horizon N. This is also shown at 315 in FIG. 3.

The method 200 may also include scanning the (e.g., color) processed seismic data to produce scanned data, as at 220. This is also shown at 320 in FIG. 3. The scan may be or include a geologic inventory scan that uses a flat time horizon and/or flat depth horizon to extract color values from the color volumes (e.g., RGB data cubes). As used herein, a flat time horizon refers to a subset of the 3D seismic data at constant time. As used herein, a depth horizon refers to a subset of the 3D seismic data at constant depth. As used herein, color values refer to data combined from three adjacent flat time or depth horizons, which are combined into RGB colors at that horizon. The geologic inventory scan helps to provide an understanding of the subsurface geology prior to interpretation; however, it may be optional.

Geologic Inventory Scan

Figure 5:
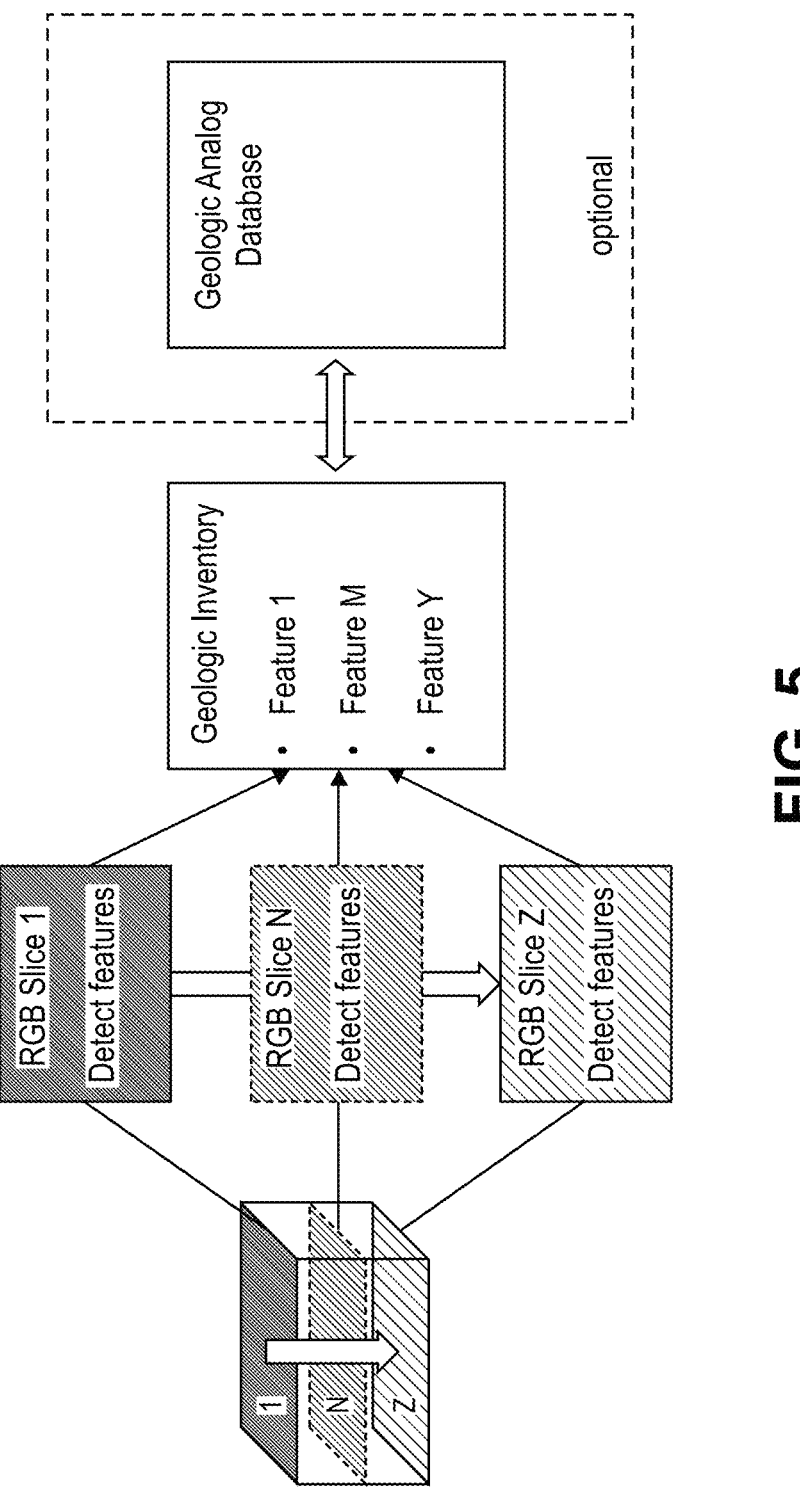
FIG. 5 illustrates a geologic inventory scan, according to an embodiment.

FIG. 5 illustrates a geologic inventory scan (e.g., 220 in FIGS. 2A and 2B), according to an embodiment. The correlation with a geologic analog database may be optional. To execute the scan, this surface may be moved from the top of the data volume to its bottom (e.g., in steps of 10 to 50 vertical samples of the data in the cube), as shown in FIG. 5.

The method 200 may also include performing a seismic interpretation on the scanned data and/or on the color volumes (e.g., color values) to identify first (e.g., regional) geologic features in the subsurface, as at 225. This is also shown at 325 in FIG. 3. The regional geologic features may be identified as a structural framework providing the boundaries for intervals of similar deposition processes. If well logs are available, these may be used to calibrate the RGB colors to lithologies at the location of the well(s). The regional geologic features may be or include channels, slope features, horizons, faults, or a combination thereof.

The method 200 may also include performing first mapping along the regional geologic features, as at 230. This is also shown at 330 in FIG. 3. More particularly, this may include performing depositional environment and structural mapping along the horizons using the color values to identify second (e.g., local) geologic features within the regional geologic features. This may identify further internal horizons which may add finer structures to the structural framework extracted earlier (e.g., at 225 in FIGS. 2A and 2B). Potential reservoir locations may be identified. In addition, sealing strata may be mapped and analyzed for seal continuity. The depositional environment mapping along the horizons (interpreted above) may indicate the usefulness for the mapping of further horizons to fill in the intervals in the horizon framework resulting from the seismic interpretation. Thus, the seismic interpretation and the first mapping may be executed iteratively.

Creation of Depositional Environment Maps

Figure 6A:
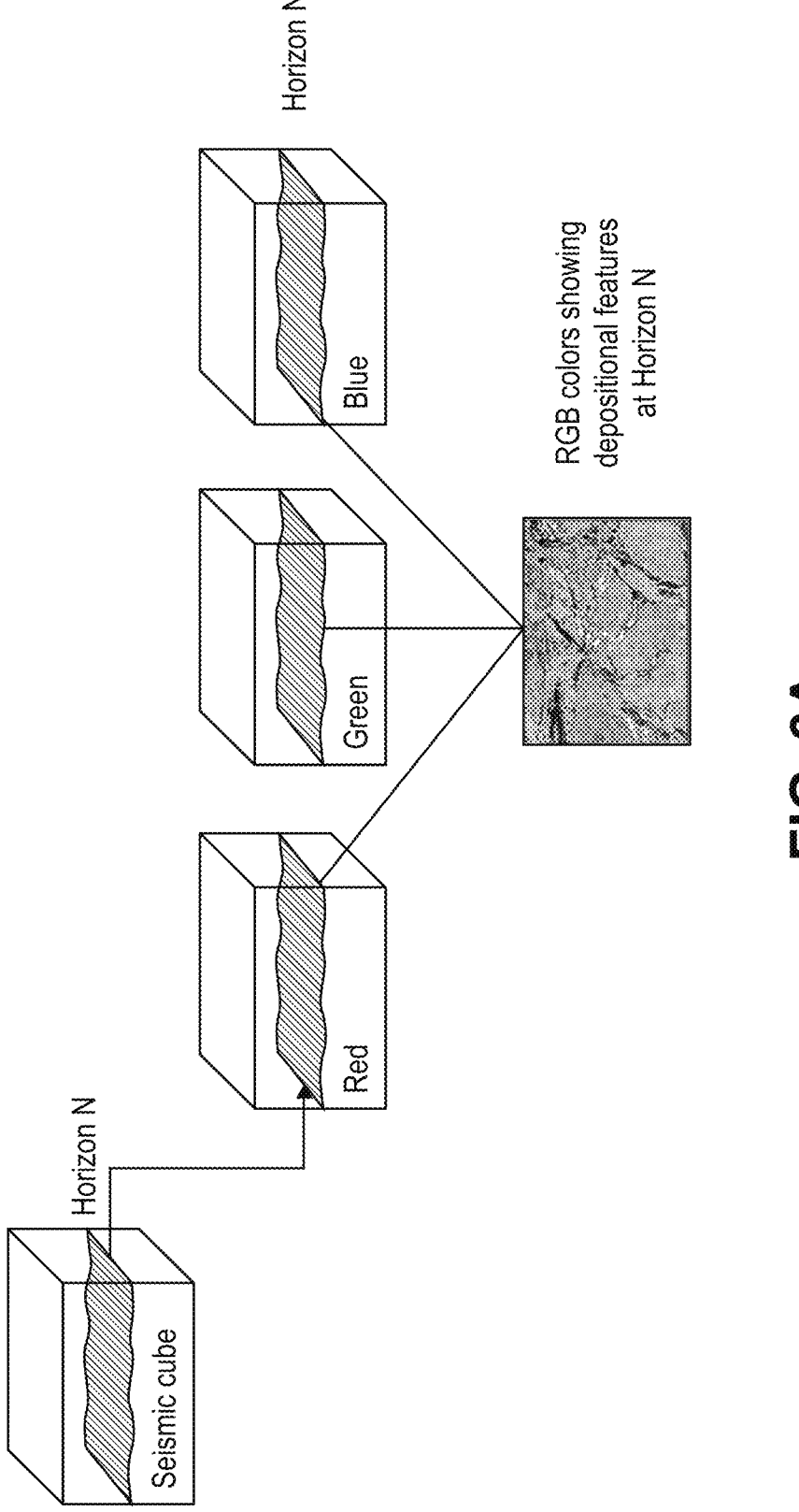
FIG. 6A illustrates the creation of depositional environment maps from extracting RGB colors along a horizon and co-rendering on this horizon, according to an embodiment.

FIG. 6A illustrates the creation of depositional environment maps from extracting RGB colors along a horizon and co-rendering on this horizon (e.g., at 230 in FIGS. 2A and 2B), according to an embodiment. Based on the seismic interpretation for horizons, the depositional environment mapping along these horizons may be executed (FIG. 6A). The horizon from the interpretation in the seismic cube under assessment may be used to extract the RGB colors from the color-processed seismic data which are then co-rendered to reveal depositional features on the horizon under assessment.

Figure 6B:
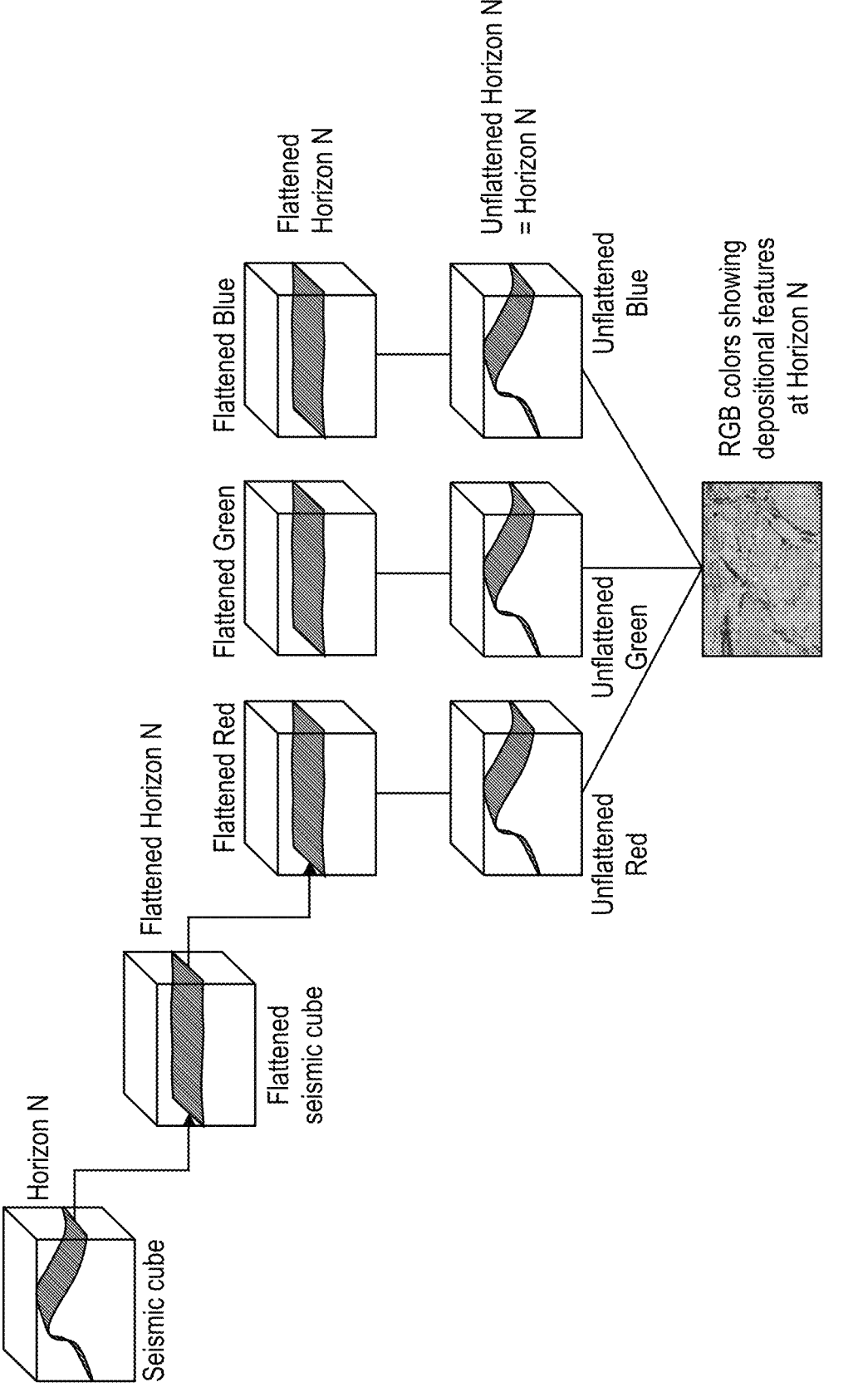
FIG. 6B illustrates a modification of the workflow shown in FIG. 6A for the case of steeply dipping horizons, according to an embodiment. In this case, a flattening of the seismic data cube to a horizon N is introduced prior to executing the color processing. This flattening may be reversed after completion of the color processing to reconstruct the geometry of the seismic input data cube.

FIG. 6B illustrates the flattening of the seismic cube prior to executing the color processing and unflattening thereafter, according to an embodiment. More particularly, FIG. 6B illustrates a modification of the workflow shown in FIG. 6A for the case that the horizons show a dip of more than 10 degrees. In this case, the seismic data cube should be flattened to a selected horizon N prior to executing the color processing to avoid interference of steep dip with the color processing. After execution of the color processing, the color cubes may be unflattened to the same horizon N to reconstruct the geometry of the seismic input data cube.

The method 200 may also include extracting reservoir bodies based upon the first mapping, as at 235. This is also shown at 355 in FIG. 3. The reservoir bodies (also referred to as reservoir geobodies) may be extracted from the local geologic features. The reservoir bodies may also or instead be extracted from the input seismic data and/or the color-processed seismic data. Reservoir bodies may be or include sand bodies that show a higher porosity than shale bodies and thus represent potential candidates for fluid storage. The data from the depositional environment mapping provides more detail about the internal texture of these reservoir bodies compared to the conventional method which assumes that the reservoir bodies possess a homogeneous internal texture.

The method 200 may also include performing second mapping along the local geologic features, as at 240. This is also shown at 340 in FIG. 3. The second mapping may embed the local geological features into the regional geologic features. More particularly, the second mapping may embed the reservoir bodies into the regional geologic features. The regional depositional environment mapping may be an extension of the local mapping at one or more locations that appear favorable for subsurface fluid storage to the entire area covered by the 3D seismic data, thus providing the regional context for favorable locations. This ensures that regional geologic features such as pinch-outs and regional sealing faults are considered when assessing, risking, and ranking a number of favorable sites in the subsurface. As used herein, a favorable site has a likelihood greater than a likelihood threshold (e.g., 80%) to allow storage of more than a predetermined amount of fluids. Embedding potential storage locations into the regional depositional environment may be helpful. In another embodiment, the interpretation of the depositional environment maps may be executed for the entire survey area.

Figure 6C:
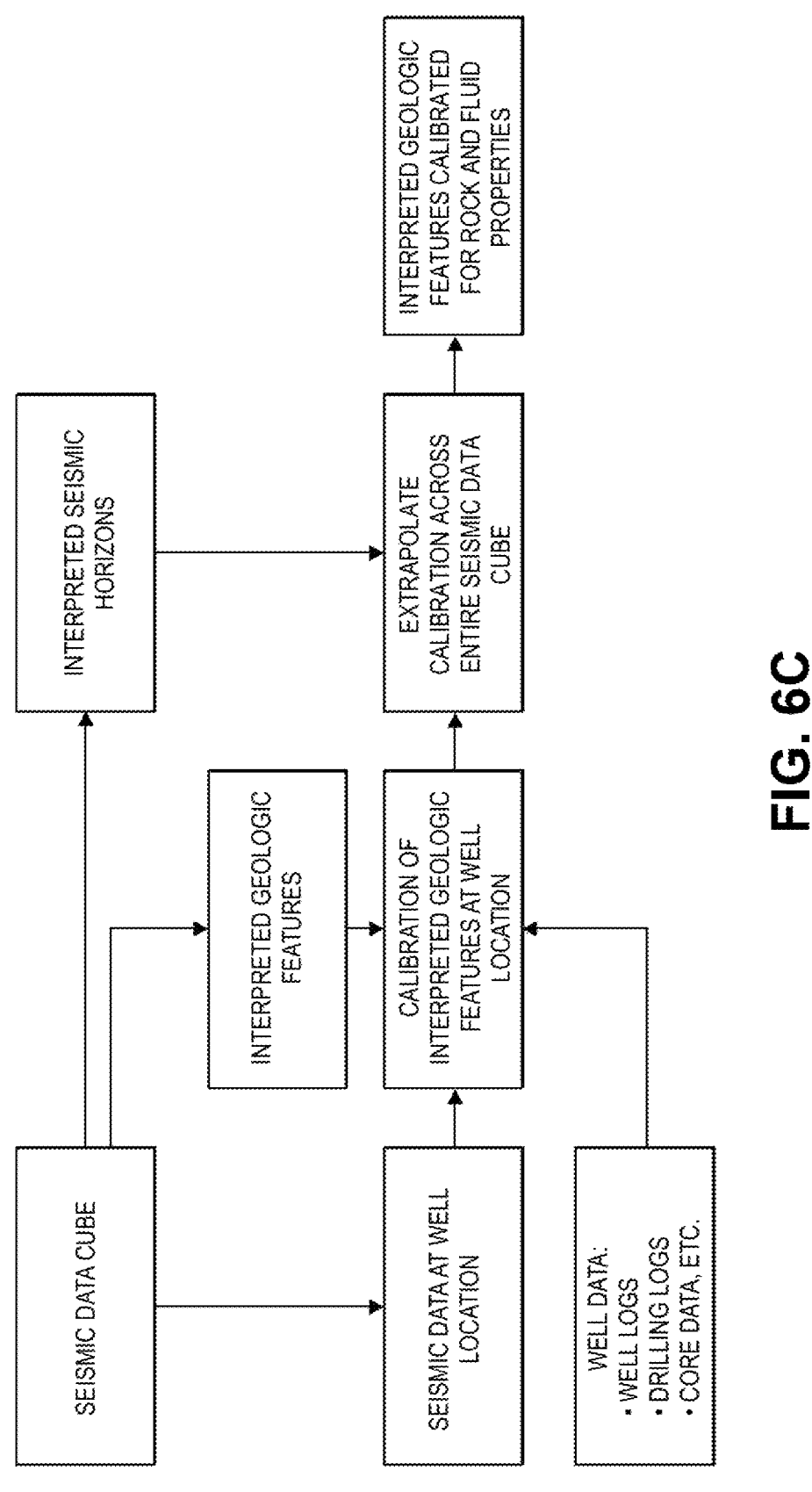
FIG. 6C illustrates the process of calibrating the geologic features interpreted from seismic data with well data such as well logs, drilling logs, core data, etc., to provide information about rock and fluid properties for these geologic features, according to an embodiment.

FIG. 6C illustrates the process of calibrating the interpreted seismic data with well data to achieve the correlation between interpreted seismic data and rock and fluid properties, according to an embodiment. This is an example of step 251 in FIGS. 2A and 2B. The seismic data may be extracted at the well location. The geological features interpreted from the seismic data may then be correlated with well logs, drilling logs, core data, etc., from the well thus creating calibrated interpreted geologic features. Using horizons interpreted in the seismic cube, the calibrated interpreted geologic features may be extrapolated across the entire seismic data cube thus creating interpreted geologic features calibrated for rock and fluid properties.

Interpretation of Depositional Horizon Maps

Figure 7:
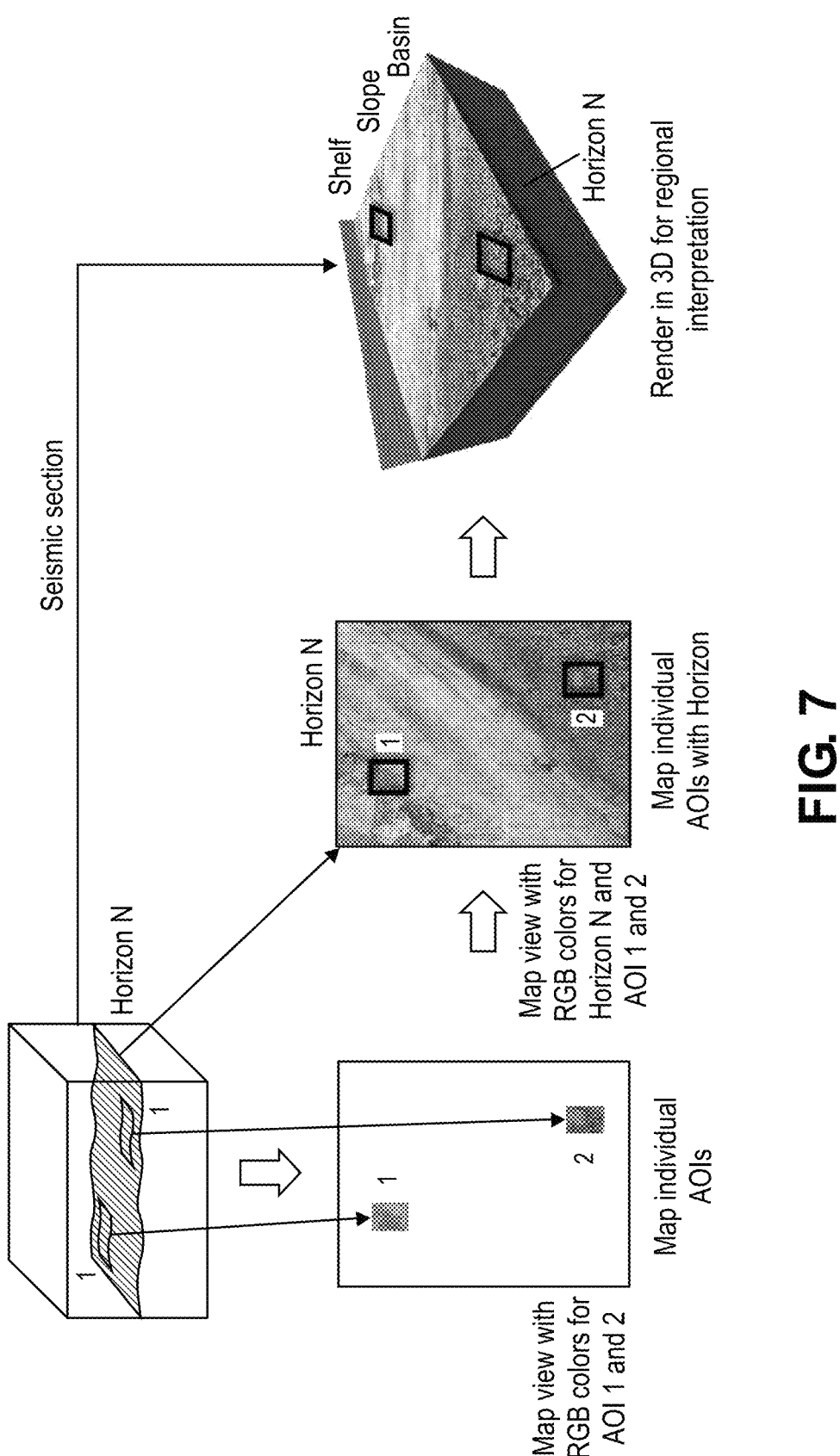
FIG. 7 illustrates an interpretation of depositional horizon maps for potential storage locations and embedding the results into the regional depositional environment, according to an embodiment.

FIG. 7 illustrates an interpretation of depositional horizon maps for potential storage locations and embedding the results into the regional depositional environment (e.g., at 240 in FIGS. 2A and 2B), according to an embodiment. From the depositional environment maps, locations with potential for geologic fluid storage may be identified for example as areas of interest (AOI) 1 and 2 (FIG. 7). The AOIs are embedded in the regional depositional context to identify formation pinch-outs, faults etc. that may have an impact on the reservoir and seal properties of the potential storage locations. The same process can be applied for the extraction of anomalies indicative of drilling hazards in the overburden.

The method 200 may also include delineating boundaries of reservoirs and/or seals in the subsurface, as at 245. This is also shown at 345 in FIG. 3. The boundaries of reservoirs and seals may be delineated in 3D by aggregating the results from one or more previous portions of the method 200. For example, the boundaries may be delineated based upon the local geologic features that are embedded into the regional geologic features.

The method 200 may also include determining parameters of a fluid reservoir in the subsurface, as at 250. The parameters may be determined based upon the boundaries of the reservoirs and/or seals. The parameters may be or include volume and/or porosity. Potential reservoirs may be captured as polylines projected to a horizon in addition to the reservoir geobodies mentioned above.

The method 200 may also optionally (as indicated by the dashed lines) include calibrating the interpretation results, as at 251. The interpretation results may be calibrated with well data. In an embodiment, the method 200 without the optional steps 211, 216, and/or 251 may represent a first workflow, and the method 200 with the optional steps 211, 216, and/or 251 may represent a second workflow.

The method 200 may also include de-risking a fluid prospect in the fluid reservoir based upon the parameters, as at 255. As used herein, "de-risking" refers to the process of assessing the likelihood of finding a reservoir volume that is greater than a likelihood threshold to allow storage of more than a predetermined amount of fluids where the reservoir body, which may be or include a sand body, is overlain by a seal which may be a or include a shale body covering the entire surface of the reservoir body and thus preventing fluids from migrating out of the reservoir body. The fluid prospect may be de-risked by computing the potential storage volume for fluids using the product of reservoir volume and reservoir porosity extracted using the method 200. Increasing the mapping accuracy of the reservoir body increases the accuracy of the estimate for the potential storage volume, thereby de-risking the uncertainty involved with the fluid prospect. The fluid prospect may be or include a carbon capture and storage (CCS) prospect, a hydrogen storage prospect, or a lithium brine extraction prospect.

Drilling Hazards

Figure 8:
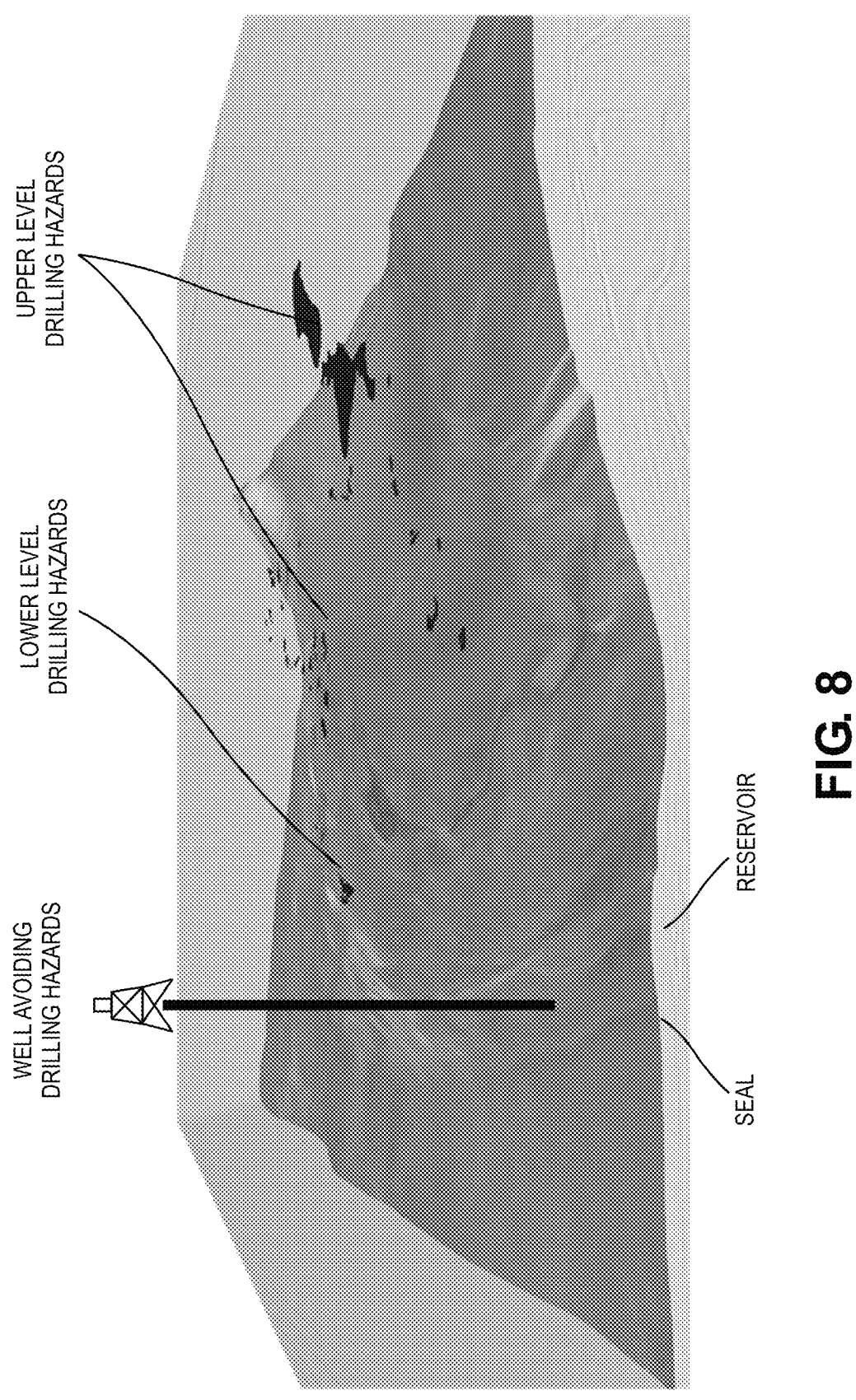
FIG. 8 illustrates a perspective view of a wellsite including drilling hazards in upper and lower portions of the subsurface, according to an embodiment.

The method 200 may also include delineating drilling hazards in the subsurface, as at 260. This is also shown at 360 in FIG. 3. FIG. 8 illustrates a perspective view of a wellsite including drilling hazards in upper and lower portions of the subsurface, according to an embodiment. This may include delineating first drilling hazards in an upper portion of the subsurface based upon the first mapping along the regional geologic features. This may also or instead include delineating second drilling hazards in a lower portion of the subsurface based upon the reservoirs and seals. Delineating the drilling hazards may include delineating overburden hazards for explosions related to shallow gas accumulations, kicks related to overpressure from fluid chimneys and pockmarks, and the risk of steep subsurface structures that may deviate the drill bit like steep slopes of large glacial valleys, ancient slope failures, giant pockmarks, or steep faults. The inventory of these features provides a 3D drilling risk volume that can be categorized for the type of drilling hazard that may be encountered. If an analogs database for geologic features exists, then the geologic inventory scan may be used to select analogs from the database that are related to the geologic features detected during the scanning process and to update the analogs with local data which in turn may be used to create a regionally trained brain for Machine Learning (ML).

The method 200 may also include displaying outputs of the method 200, as at 265. The outputs may be or include the regional geologic features, the local geologic features, the reservoir bodies, the boundaries and seals, the volume and porosity, the fluid prospect, the first drilling hazards, the second drilling hazards, or a combination thereof.

The method 200 may also include performing a wellsite action, as at 270. This is also shown at 370 in FIG. 3. The wellsite action may be part of a fluid storage and/or extraction process. In another embodiment, the wellsite action may be performed to avoid the drilling hazards. The wellsite action may be based upon the regional geologic features, the local geologic features, the reservoir bodies, the boundaries and seals, the volume and porosity, the fluid prospect, the first drilling hazards, the second drilling hazards, or a combination thereof. The wellsite action may be or include generating and/or transmitting a signal (e.g., using a computing system) that causes a physical action to occur at a wellsite. The wellsite action may also or instead include performing the physical action at the wellsite. The physical action may include selecting where to drill a wellbore, drilling the wellbore, varying a weight and/or torque on a drill bit that is drilling the wellbore, varying a drilling trajectory of the wellbore, varying a concentration and/or flow rate of a fluid pumped into the wellbore, storing a fluid (e.g., carbon and/or hydrogen) in the fluid prospect, extracting a fluid (e.g., lithium brine) from the fluid prospect, or the like.

One or more portions of the method 200 may also or instead be executed for the overburden to identify and extract the drilling hazards related to gas accumulations, faults, steep depositional features, or a combination thereof. One or more portions of the method 200 may also or instead be executed to provide geologic analogs for analog databases. These databases may be local and/or regional for the dataset under assessment, or may be included in a database covering an area larger than the seismic survey under assessment.

The start of the method 200 considers the availability of multiple legacy 3D seismic surveys. This situation is desirable to provide an area as large as possible for the extraction of regional depositional environment maps. The merge of several legacy seismic surveys may consider amplitude and/or spectral matching of the seismic data to provide a suitable input to regional depositional environment mapping.

For both, merged legacy as well as newly acquired 3D seismic data, the correction for seismic velocity heterogeneities may be considered. Such heterogeneities may be related to the topography of the land surface or the ocean bottom, shallow glacial features, karsts, ancient slope failures, or gas accumulations. It may, therefore, be useful to execute the color processing and/or the geologic inventory scan of the method 200 prior to processing the input seismic data. Experience shows that the shallower such velocity variations are, the more relevant their identification and mitigation is.

Another aspect is the preservation of the spectral bandwidth of the seismic data through data processing. Attention may be paid to the processes that involve averaging or low frequency modelling as the execution of these processes may reduce the spectral bandwidth of the data irreversibly and hence lead to reduced vertical resolution for mapping reservoir bodies. 3D color processing has been added to the workflow as it calculates impedance contrast correlation values between adjacent slices of the input data. This process ensures that the original spectral bandwidth of the data is retained in contrast to traditional trace-based wavelet attributes which use multi-sample windows for the computation of the seismic attributes that are subsequently interpreted. Color processing has the added advantage of enabling the rendering of the results as RGB colors, which has been shown to provide an enhanced dynamic range for the results.

Alternate Applications

The method(s) described herein can be applied (e.g., with or without changes) for the following subsurface energy applications:

1. Exploration for hydrocarbons including near-field exploration and infra-structure led exploration.
2. Carbon sequestration (i.e., geological storage of $CO2$ in the subsurface in depleted hydrocarbon reservoirs or in newly explored reservoirs)—the case mostly referred to in the explanations above.
3. Geological storage of hydrogen in the subsurface in depleted hydrocarbon reservoirs or in newly explored reservoirs.
4. Identification of reservoirs for brine containing lithium. In this case, the well logs may be calibrated with/for geochemistry.
5. Geological storage of compressed air.

Exemplary Computing System

Figure 9:
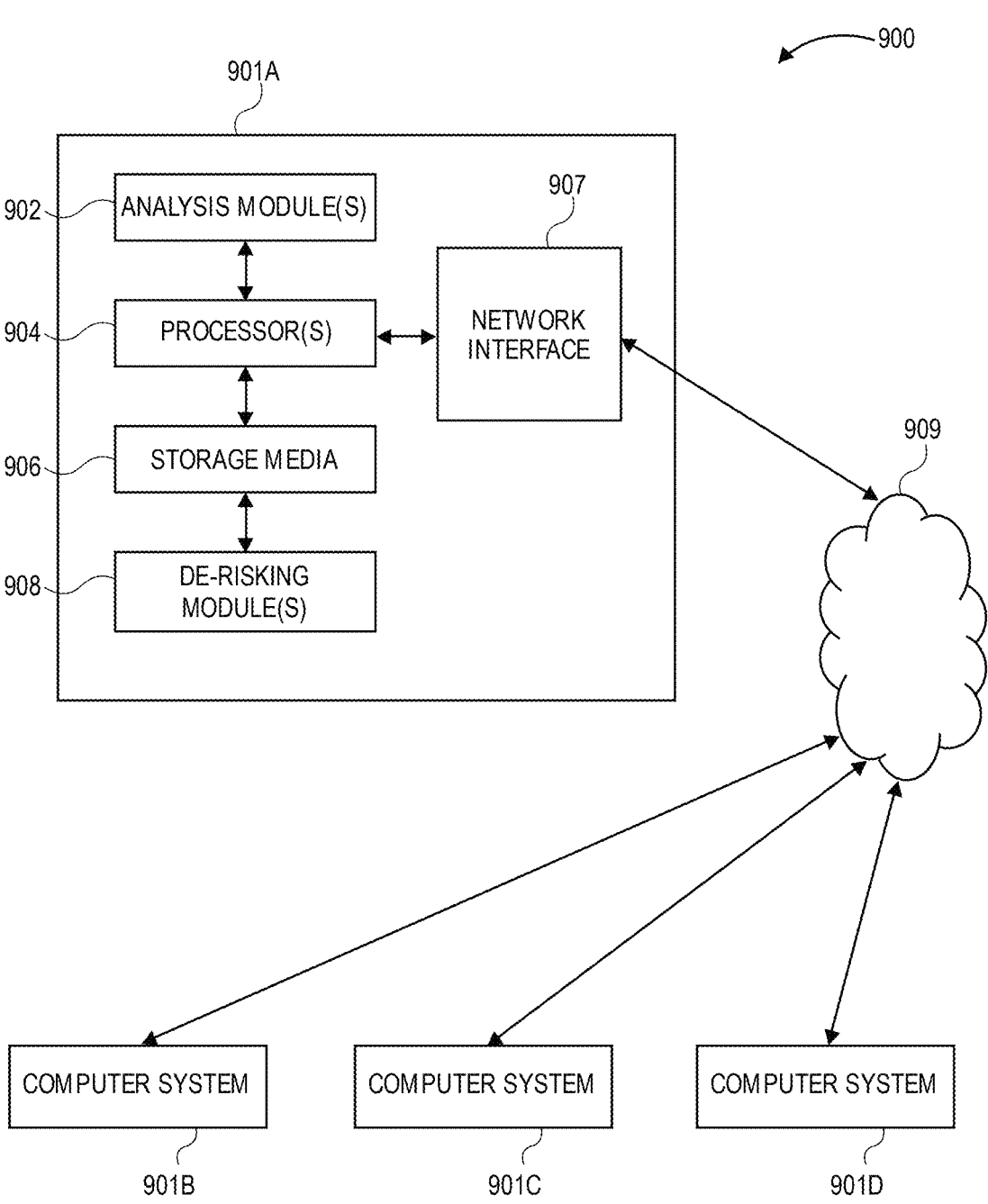
FIG. 9 illustrates a schematic view of a computing system for performing at least a portion of the method(s) described herein, according to an embodiment.

In some embodiments, the methods of the present disclosure may be executed by a computing system. FIG. 9 illustrates an example of such a computing system 900, in accordance with some embodiments. The computing system 900 may include a computer or computer system 901A, which may be an individual computer system 901A or an arrangement of distributed computer systems. The computer system 901A includes one or more analysis modules 902 that are configured to perform various tasks according to some embodiments, such as one or more methods disclosed herein. To perform these various tasks, the analysis module 902 executes independently, or in coordination with, one or more processors 904, which is (or are) connected to one or more storage media 906. The processor(s) 904 is (or are) also connected to a network interface 907 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents).

A processor may include a microprocessor, microcontroller, processor module or subsystem, programmable integrated circuit, programmable gate array, or another control or computing device.

The storage media 906 may be implemented as one or more computer-readable or machine-readable storage media. Note that while in the example embodiment of FIG. 9 storage media 906 is depicted as within computer system 901A, in some embodiments, storage media 906 may be distributed within and/or across multiple internal and/or external enclosures of computing system 901A and/or additional computing systems. Storage media 906 may include one or more different forms of memory including semiconductor memory devices such as dynamic or static random access memories (DRAMs or SRAMs), erasable and programmable read-only memories (EPROMs), electrically erasable and programmable read-only memories (EE-PROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 900 contains one or more de-risking module(s) 908. In the example of computing system 900, computer system 901A includes the de-risking module 908. In some embodiments, a single de-risking module may be used to perform some aspects of one or more embodiments of the methods disclosed herein. In other embodiments, a plurality of de-risking modules may be used to perform some aspects of methods herein.

It should be appreciated that computing system 900 is merely one example of a computing system, and that computing system 900 may have more or fewer components than shown, may combine additional components not depicted in the example embodiment of FIG. 9, and/or computing system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 900, FIG. 9), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method for de-risking fluid prospects in a subsurface, the method comprising:

receiving input seismic data of the subsurface, wherein the input seismic data comprises 3D seismic data;

processing the input seismic data to produce processed seismic data, wherein processing the input seismic data comprises modifying the input seismic data to correct for seismic near-surface velocity fluctuations in the input seismic data, wherein processing the input seismic data retains a frequency bandwidth of the input seismic data, and wherein the processed seismic data has a cleaner and more balanced seismic amplitude response in a lateral direction than the input seismic data;

flattening the processed seismic data to produce flattened seismic data, wherein the processed seismic data is flattened in response to the processed seismic data comprising a steeply dipping horizon;

color processing the flattened seismic data to produce color-processed seismic data, wherein color processing the processed seismic data comprises red-green-blue (RGB) color processing, which creates color volumes for geologic interpretation of the subsurface, wherein the color volumes have a higher resolution than the input seismic data and the processed seismic data, and wherein flattening the processed seismic data avoids interference of the steeply dipping horizon with the color processing;

unflattening the color-processed seismic data to produce unflattened seismic data;

scanning the unflattened seismic data to produce scanned data, wherein scanning the unflattened seismic data comprises performing a geologic inventory scan that uses a flat time horizon or a flat depth horizon to extract color values from the color volumes, and wherein scanning the unflattened seismic data identifies classes of geologic features;

performing a seismic interpretation on the color processed seismic scanned data or on the color values to identify regional geologic features in the subsurface, wherein the regional geologic features comprise channels, slope features, horizons, or faults;

performing first mapping along the regional geologic features, wherein performing the first mapping comprises performing depositional environment and structural mapping along the steeply dipping horizon using the color values to identify local geologic features within the regional geologic features;

extracting reservoir bodies based upon the first mapping, wherein the reservoir bodies are extracted from the local geologic features, and wherein the reservoir bodies comprise sand bodies having a higher porosity than shale bodies;

performing second mapping along the local geologic features to embed the local geological features into the regional geologic features, wherein performing the second mapping comprises embedding the reservoir bodies into the regional geologic features;

correlating the local geologic features and/or the regional geologic features with well data captured in a well for calibration of the seismic interpretation with rock and fluid properties, wherein the well data comprises well logs, drilling logs, and core data;

extrapolating the rock and fluid properties based upon the well data away from the well into a seismic data volume using seismic horizons and starting at an intersection of the seismic horizons with the well;

delineating boundaries of reservoirs and seals in the subsurface based upon the local geologic features that are embedded into the regional geologic features;

determining a volume and a porosity of a fluid reservoir in the subsurface based upon the boundaries of the reservoirs and the seals;

de-risking a fluid prospect in the fluid reservoir based upon the volume and the porosity, wherein the fluid prospect comprises a carbon capture and storage (CCS) prospect, a hydrogen storage prospect, or a lithium brine extraction prospect, and wherein the fluid prospect is de-risked by assessing the rock and fluid properties of the reservoir bodies to determine whether the channels or cavities are present therein, assessing the seals for potential breaches by the faults or fractures, and assessing an overburden for sufficient thickness to support the seals; and displaying the regional geologic features, the local geologic features, the reservoir bodies, the boundaries and seals, the volume and porosity, and the fluid prospect.

2. The method of claim 1, further comprising performing a physical wellsite action in response to the local geological features embedded into the regional geologic features.

3. The method of claim 1, further comprising delineating first drilling hazards in an upper level of the subsurface based upon the first mapping along the regional geologic features.

4. The method of claim 3, further comprising delineating second drilling hazards in a lower level of the subsurface based upon the reservoirs and the seals.

5. The method of claim 4, further comprising performing a wellsite action based upon the boundaries of the reservoirs and the seals, the first drilling hazards, and the second drilling hazards.

6. The method of claim 5, wherein the wellsite action comprises selecting where to drill a wellbore, drilling the wellbore, varying a weight and/or torque on a drill bit that is drilling the wellbore, varying a drilling trajectory of the wellbore, varying a concentration and/or flow rate of a fluid pumped into the wellbore, storing carbon or hydrogen fluid in the fluid prospect, or extracting lithium brine fluid from the fluid prospect.

7. A computing system, comprising:
one or more processors; and
a memory system comprising one or more non-transitory computer-readable media storing instructions that, when executed by at least one of the one or more processors, cause the computing system to perform operations, the operations comprising:
receiving input seismic data of a subsurface, wherein the input seismic data comprises 3D seismic data;
processing the input seismic data to produce processed seismic data, wherein processing the input seismic data comprises modifying the input seismic data to correct for seismic near-surface velocity fluctuations in the input seismic data, wherein processing the input seismic data retains a frequency bandwidth of the input seismic data, and wherein the processed seismic data has a cleaner and more balanced seismic amplitude response in a lateral direction than the input seismic data;

flattening the processed seismic data to produce flattened seismic data, wherein the processed seismic data is flattened in response to the processed seismic data comprising steeply dipping horizons;

color processing the flattened seismic data to produce color-processed seismic data, wherein color processing the processed seismic data comprises red-green-blue (RGB) color processing, which creates color volumes for geologic interpretation of the subsurface, wherein the color volumes have a higher resolution than the input seismic data and the processed seismic data, and wherein flattening the processed seismic data avoids interference of the steeply dipping horizons with the color processing;

unflattening the color-processed seismic data to produce unflattened seismic data;

scanning the unflattened seismic data to produce scanned data, wherein scanning the unflattened seismic data comprises performing a geologic inventory scan that uses a flat time horizon or a flat depth horizon to extract color values from the color volumes, and wherein scanning the unflattened seismic data identifies classes of geologic features;

performing a seismic interpretation on the scanned data or on the color values to identify regional geologic features in the subsurface, wherein the regional geologic features comprise channels, slope features, horizons, or faults;

performing first mapping along the regional geologic features, wherein performing the first mapping comprises performing depositional environment and structural mapping along the steeply dipping horizons using the color values to identify local geologic features within the regional geologic features;

extracting reservoir bodies based upon the first mapping, wherein the reservoir bodies are extracted from the local geologic features, and wherein the reservoir bodies comprise sand bodies having a higher porosity than shale bodies;

performing second mapping along the local geologic features to embed the local geological features into the regional geologic features, wherein performing the second mapping comprises embedding the reservoir bodies into the regional geologic features;

correlating the local geologic features and/or the regional geologic features with well data captured in a well for calibration of the seismic interpretation with rock and fluid properties, wherein the well data comprises well logs, drilling logs, and core data;

extrapolating the rock and fluid properties based upon the well data away from the well into a seismic data volume using seismic horizons and starting at an intersection of the seismic horizons with the well;

delineating boundaries of reservoirs and seals in the subsurface based upon the local geologic features that are embedded into the regional geologic features;

determining a volume and a porosity of a fluid reservoir in the subsurface based upon the boundaries of the reservoirs and the seals;

de-risking a fluid prospect in the fluid reservoir based upon the volume and the porosity, wherein the fluid prospect comprises a carbon capture and storage (CCS) prospect, a hydrogen storage prospect, or a lithium brine extraction prospect, and wherein the fluid prospect is de-risked by assessing the rock and fluid properties of the reservoir bodies to determine whether the channels or cavities are present therein, assessing the seals for potential breaches by the faults or fractures, and assessing an overburden for sufficient thickness to support the seals; and displaying the regional geologic features, the local geologic features, the reservoir bodies, the boundaries and seals, the volume and porosity, and the fluid prospect.

8. The computing system of claim 7, wherein the operations further comprise delineating first drilling hazards in an upper level of the subsurface based upon the first mapping along the regional geologic features.

9. The computing system of claim 8, wherein the operations further comprise delineating second drilling hazards in a lower level of the subsurface based upon the reservoirs and the seals.

10. The computing system of claim 9, wherein the operations further comprise performing a wellsite action based upon the boundaries of the reservoirs and the seals, the first drilling hazards, and the second drilling hazards.

11. The computing system of claim 10, wherein the wellsite action comprises selecting where to drill a wellbore, drilling the wellbore, varying a weight and/or torque on a drill bit that is drilling the wellbore, varying a drilling trajectory of the wellbore, varying a concentration and/or flow rate of a fluid pumped into the wellbore, storing carbon or hydrogen fluid in the fluid prospect, or extracting lithium brine fluid from the fluid prospect.

12. A non-transitory computer-readable medium storing instructions that, when executed by one or more processors of a computing system, cause the computing system to perform operations, the operations comprising:

receiving input seismic data of a subsurface, wherein the input seismic data comprises 3D seismic data;

processing the input seismic data to produce processed seismic data, wherein processing the input seismic data comprises modifying the input seismic data to correct for seismic near-surface velocity fluctuations in the input seismic data, wherein processing the input seismic data retains a frequency bandwidth of the input seismic data, and wherein the processed seismic data has a cleaner and more balanced seismic amplitude response in a lateral direction than the input seismic data;

flattening the processed seismic data to produce flattened seismic data, wherein the processed seismic data is flattened in response to the processed seismic data comprising steeply dipping horizons;

color processing the flattened seismic data to produce color-processed seismic data, wherein color processing the processed seismic data comprises red-green-blue (RGB) color processing, which creates color volumes for geologic interpretation of the subsurface, wherein the color volumes have a higher resolution than the input seismic data and the processed seismic data, and wherein flattening the processed seismic data avoids interference of the steeply dipping horizons with the color processing;

unflattening the color-processed seismic data to produce unflattened seismic data;

scanning the unflattened seismic data to produce scanned data, wherein scanning the unflattened seismic data comprises performing a geologic inventory scan that uses a flat time horizon or a flat depth horizon to extract color values from the color volumes, and wherein scanning the unflattened seismic data identifies classes of geologic features;

performing a seismic interpretation on the scanned data or on the color values to identify regional geologic features in the subsurface, wherein the regional geologic features comprise channels, slope features, horizons, or faults;

performing first mapping along the regional geologic features, wherein performing the first mapping comprises performing depositional environment and structural mapping along the steeply dipping horizons using the color values to identify local geologic features within the regional geologic features;

extracting reservoir bodies based upon the first mapping, wherein the reservoir bodies are extracted from the local geologic features, and wherein the reservoir bodies comprise sand bodies having a higher porosity than shale bodies;

performing second mapping along the local geologic features to embed the local geological features into the regional geologic features, wherein performing the second mapping comprises embedding the reservoir bodies into the regional geologic features;

correlating the local geologic features and/or the regional geologic features with well data captured in a well for calibration of the seismic interpretation with rock and fluid properties, wherein the well data comprises well logs, drilling logs, and core data;

extrapolating the rock and fluid properties based upon the well data away from the well into a seismic data volume using seismic horizons and starting at an intersection of the seismic horizons with the well;

delineating boundaries of reservoirs and seals in the subsurface based upon the local geologic features that are embedded into the regional geologic features;

determining a volume and a porosity of a fluid reservoir in the subsurface based upon the boundaries of the reservoirs and the seals;

de-risking a fluid prospect in the fluid reservoir based upon the volume and the porosity, wherein the fluid prospect comprises a carbon capture and storage (CCS) prospect, a hydrogen storage prospect, or a lithium brine extraction prospect, and wherein the fluid prospect is de-risked by assessing the rock and fluid properties of the reservoir bodies to determine whether the channels or cavities are present therein, assessing the seals for potential breaches by the faults or fractures, and assessing an overburden for sufficient thickness to support the seals; and displaying the regional geologic features, the local geologic features, the reservoir bodies, the boundaries and seals, the volume and porosity, and the fluid prospect.

13. The non-transitory computer-readable medium of claim 12, wherein the operations further comprise delineating first drilling hazards in an upper level of the subsurface based upon the first mapping along the regional geologic features.

14. The non-transitory computer-readable medium of claim 13, wherein the operations further comprise delineating second drilling hazards in a lower level of the subsurface based upon the reservoirs and the seals.

15. The non-transitory computer-readable medium of claim 14, wherein the operations further comprise performing a wellsite action based upon the boundaries of the reservoirs and the seals, the first drilling hazards, and the second drilling hazards.

16. The non-transitory computer-readable medium of claim 15, wherein the wellsite action comprises selecting where to drill a wellbore, drilling the wellbore, varying a weight and/or torque on a drill bit that is drilling the wellbore, varying a drilling trajectory of the wellbore, varying a concentration and/or flow rate of a fluid pumped into the wellbore, storing carbon or hydrogen fluid in the fluid prospect, or extracting lithium brine fluid from the fluid prospect.

* * * * *